N. L. OLSON.
TRACTOR ATTACHMENT FOR AUTOMOBILES.
APPLICATION FILED SEPT. 16, 1915.
1,291,619.
Patented Jan. 14, 1919.
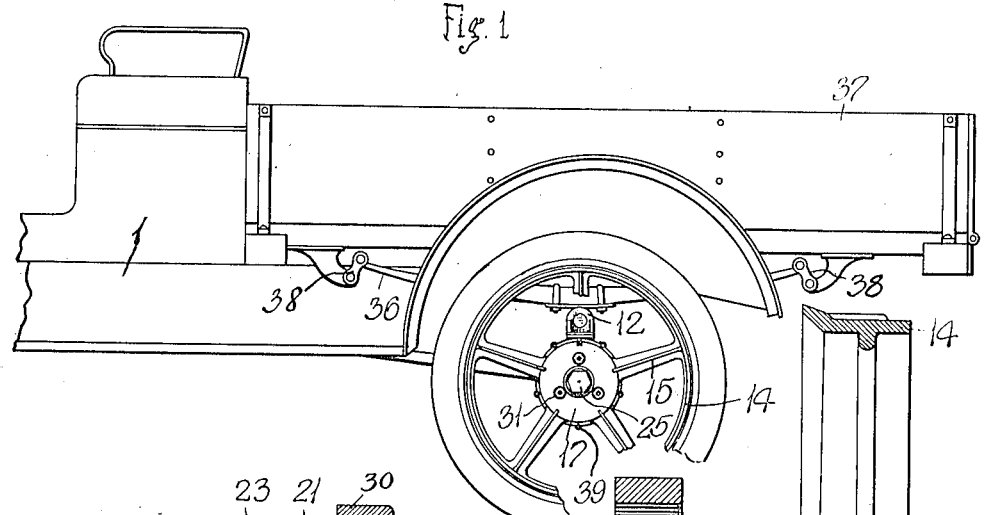
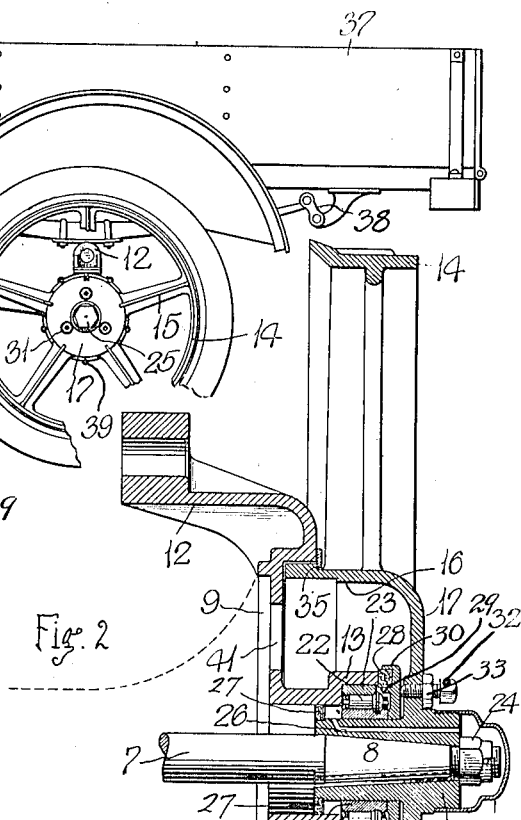
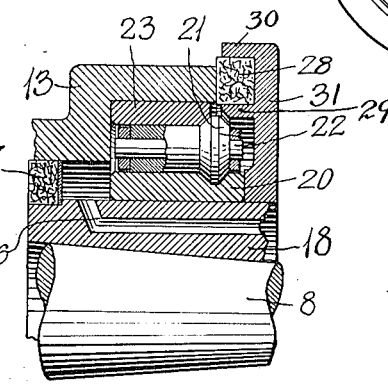
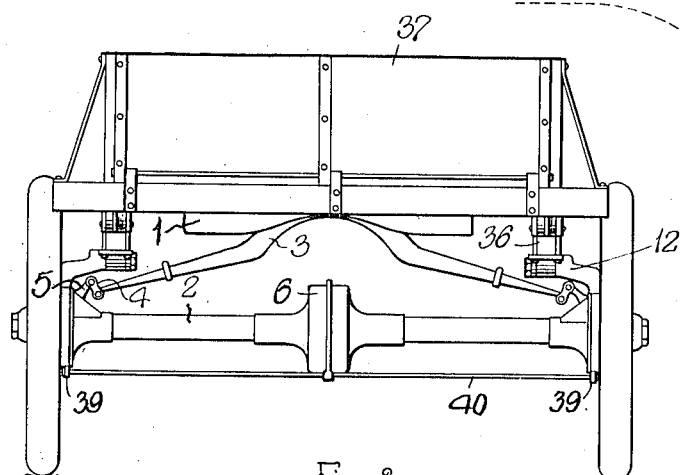
Witnesses
Anna M Dorr.
Chas W. Stauffiger.
Inventor
Nels L. Olson
By
Bakewell & Bakewell
Attorneys

UNITED STATES PATENT OFFICE.

NELS L. OLSON, OF DETROIT, MICHIGAN.

TRACTOR ATTACHMENT FOR AUTOMOBILES.

1,291,619.　　　　　　Specification of Letters Patent.　　Patented Jan. 14, 1919.

Application filed September 16, 1915.　Serial No. 50,927.

*To all whom it may concern:*

Be it known that I, NELS L. OLSON, a citizen of the United States of America, residing at Detroit, in the county of Wayne and State of Michigan, have invented certain new and useful Improvements in Tractor Attachments for Automobiles, of which the following is a specification, reference being had therein to the accompanying drawings.

This invention relates to an attachment for automobiles whereby they are readily converted from road or touring cars to vehicles that are capable of carrying heavy loads so that they are available for trucking purposes. The invention includes means whereby the conversion of the vehicle may be accomplished without the necessity of changing or interfering in any way with the ordinary driving gear or the chassis, and without imposing special load upon the chassis itself.

The invention consists in the matters hereinafter set forth, and more particularly pointed out in the appended claims.

In the drawings,

Figure 1 is a view in side elevation, partially broken away and partly diagrammatic of a vehicle equipped with a device that embodies features of the invention;

Fig. 2 is a view in section of the traction wheel and fitting of the device;

Fig. 3 is a view in end elevation of the vehicle shown in Fig. 1, and

Fig. 4 is a view in detail showing a thrust bearing for a traction wheel.

As herein shown, a chassis 1 of conventional type is mounted on the standard rear or driving axle 2 as by means of a transverse semi-elliptical spring 3 to the crown of which it is attached, the ends of the spring being suspended in shackles 4 that are secured to the spring perches or lugs 5 near the ends of the axle 2 of the body. As in the usual car, it is to be understood that a differential gearing in the housing or enlargement 6 at the center of the axle, drives a pair of members 7 of the two-part differential shaft common in machines of this kind. The tapered end portion 8 of each projects beyond the brake flange 9 of the axle. It receives the usual traction bearing wheels.

An auxiliary bearing fitting in the form of a plate 10 having an annular flange 11 engaging over the periphery of the axle drum flange 9 with upwardly extending spring perch or bracket 12 for attachment of a body and a centrally disposed bearing barrel 13 enlarged slightly at its outer end, is secured against the end of the axle housing in axial alinement therewith. Any means may be used for detachably locking the plate 10 in position.

A traction bearing wheel has a rim member 14 suitably supported as by spokes 15 or other web members concentrically on the flange 16 of a spider 17 that is provided with a hub 18 adapted to be keyed or otherwise made fast on the tapered portion 8 of the shaft. The marginal portion of the flange 16 rotates within a mating flange 19 formed on the plate 10 and the inner periphery thereof is adapted to receive an internal expansion brake (not shown) which is readily operated through the opening 41 of the plate. A suitable anti-friction and end thrust bearing is interposed between the inner portion of the hub 18 and the barrel 13. As herein shown in preferred form, such bearing includes an inner bushing 20 sleeved on the hub barrel and provided with a V-shaped peripheral groove in which correspondingly formed peripheral flanges 21 of a set of friction rollers 22 travel, the bodies of the latter acting as spacing members to hold an outer sleeve 23 that is inserted in the barrel 13 in concentric relation with the sleeve 20. The oblique faces of the flanges 21 adjacent the sleeve 23 shoulder against a correspondingly oblique face at the end thereof, and thereby the rollers set as a thrust bearing and prevent endwise movement of the wheel. A bur 24 on the screw-threaded reduced end portion of the tapered part 8 of each driving shaft 7 maintains the hub on the shaft. A dust cap 25 thereover that is preferably screwthreaded on to the hub 18, acts also as a grease cup whereby lubricant may be forced through a suitable duct 26 into a chamber formed between the anti-friction bearing just described, and a suitable felt washer or the like 27 is interposed between the housing of the axle and the hub of the wheel. Another ring or washer 28 for like purposes is maintained between the concentric flanges 29 and 30 of a thrust collar 31 that is sleeved on the hub of the wheel and is held against the outer end of the bushing 20 of the bearing by means of a suitable thrust stud 32 with holding jam nut 33. This permits slight adjustment of the parts longitudinally of the axle to allow for variation in the length of the hub and in the length of the shaft 8 and in the position that the wheel assumes when forced on to the tapered part.

As a safe-guard against detachment from the chassis in case the shaft 7 breaks, each fitting has a guard ring 34 formed in sections and applied to the outer face of the flange 19 to overrun a shoulder indicated at 35 on the flange 16 of the drum 17.

Suitable springs such as indicated at 36 with auxiliary body 37 hung thereon in suitable shackles 38, may be carried each by the spring perch bracket 12 above the chassis. Depending lugs 39 afford means for a cross bar 40 which may be used to attach a trailer or agricultural machine thereto and which also acts as a truss rod for the axle. The body 37 may be directly mounted on the fitting or on the springs as indicated. It may tilt if desired or may be otherwise arranged as preferred.

By this arrangement a road vehicle is readily converted into a load carrier or truck without fear of injury to the chassis, as the load that is normally supported on the auxiliary body is carried through the springs directly to the ends of the axle housing through the applied fittings and then directly to the hub of the wheels through the auxiliary bearings. As a consequence no strain comes upon the chassis from such abnormal load, and in fact the chassis carries no weight only as the auxiliary springs yield far enough to transfer some of the load of the body to the chassis itself.

As a further result of this construction, a road vehicle is made convertible into a load carrier or truck without the necessity of change of any of its parts other than the removal of the ordinary traction wheels. So the car has all the advantages of the road vehicle and the practicability of a truck.

Obviously, changes in the details of construction may be made without departing from the spirit of my invention and I do not care to limit myself to any particular form or arrangement of parts.

What I claim is:—

1. An attachment for an automobile comprising a traction wheel adapted to be detachably secured to a differential driving shaft member, a bearing fitting adapted to be detachably secured to the housing of the driving shaft member, and a bearing for the wheel supported in the fitting for maintaining the wheel in axial alinement with the shaft, and adapted to transmit the load from the fitting directly to the wheel.

2. An attachment for an automobile comprising a traction wheel adapted to be detachably secured to a differential driving shaft member, a bearing fitting adapted to be rigidly secured to the housing of the shaft and provided with means for supporting directly a truck body, and a bearing for the wheel interposed between the fitting and the wheel hub and adapted to transmit the load from the fitting directly to the wheel.

3. An attachment for an automobile comprising a traction wheel adapted to be detachably secured to a differential driving shaft mechanism, a bearing fitting adapted to be rigidly secured to the housing of the shaft and provided with means for supporting directly a truck body, and a bearing for the wheel interposed between the fitting and the wheel hub and adapted to transmit the load from the fitting directly to the wheel, the bearing being also adapted to prevent endwise movement of the wheel.

4. An attachment for an automobile comprising a traction wheel adapted to be detachably secured to a differential driving shaft member, a bearing fitting adapted to be rigidly secured to the housing of the shaft concentrically with the differential driving shaft member, and a bearing mounted in the fitting in which the hub of the wheel revolves, adapted to prevent endwise movement of the wheel.

5. An attachment for an automobile comprising a traction wheel adapted to be detachably secured to a differential driving shaft member and provided with a central spider having a hollow hub and an internal expansion brake flange, a fitting adapted to be detachably secured to the housing of the driving shaft member and provided with a load bearing bracket, and a bearing for the hub of the wheel concentric therewith and secured in the fitting in concentric relation with the differential driving shaft member, adapted to prevent endwise movement of the wheel.

6. An attachment for an automobile comprising a traction wheel adapted to be detachably secured to a differential driving shaft member, a bearing fitting adapted to be detachably secured to the housing of the driving shaft member, a bearing around the wheel hub mounted in the fitting and provided with anti-friction members adapted to prevent endwise movement of the hub, a guard ring on the fitting for preventing outward movement of the wheel, and a dust cap on the wheel hub adapted to operate as a compression cup to force grease or other lubricant into the interior of the fitting bearing.

7. An attachment for an automobile comprising in combination with a differential driving shaft housing and a differential driving shaft member therein, a bearing fitting secured to the end of the housing and provided with a load bearing bracket, a bearing mounted in the fitting, a traction bearing wheel journaled in the bearing and secured to the differential driving shaft member, means forming an outer thrust ring for the bearing of the fitting, means for securing the same in adjusted relation to the nave of the wheel and a guard ring for maintaining the wheel in proper relation to the bearing and fitting regardless of the connection thereof with the driving shaft member.

8. An automobile attachment, comprising in combination with the driving shaft housing and differential driving shaft member, a bearing fitting secured to the shaft housing detachably and provided with a load bearing member, anti-friction end thrust bearings mounted in the fitting, a wheel having a central spider provided with a hub secured detachably to the differential driving shaft member, and journaled in the bearing, and members adapted to maintain the wheel in position regardless of its connection with the shaft.

9. An attachment for an automobile comprising in combination with a differential driving shaft housing and a differential driving shaft anchored therein, a bearing fitting detachably secured to the outer end of the housing and provided with a load bearing bracket; a bearing barrel on the fiting alined substantially with the housing, a traction bearing wheel, a hub therefor detachably secured to the differential driving shaft member, a roller bearing sleeve mounted on the hub, flanged rollers traveling on the sleeve in the correspondingly shaped face thereof, an outer bearing sleeve mounted on the rollers and secured in the barrel of the fitting, a thrust plate on the hub bearing against the sleeve thereon and forming a dust cap for the bearing, means in the spider for adjusting the thrust plate longitudinally of the hub and a dust cap for the hub forming a compression grease cup for forcing lubricant into the bearing through the hub.

10. The combination of a drive axle housing having a brake flange end and a differential driving shaft member rotatable in the housing, with a bearing fitting detachably secured over and against the flanged end of the housing and provided with a bearing load bracket, a bearing barrel formed on the fitting through which the driving shaft member extends, a traction bearing wheel having a hub secured to the traction shaft end portion, an anti-friction and end thrust bearing having one member secured to the hub, an outer member mounted in the barrel and interposed anti-friction and end thrust elements between the hub and barrel member, a thrust ring and dust cap longitudinally adjustable on the hub and engaging the hub member of the bearing, a spider on the hub having an inner peripheral brake face and an outer face turning loosely in the fitting, a guard ring on the fitting embracing the spider loosely and preventing outward movement thereof, and means in the spider abutting the thrust collar for shifting the latter longitudinally of the hub.

11. The combination with an axle housing having a brake-head at the end thereof and an axle-shaft projecting therefrom for carrying the load into the wheel, of an attachment comprising a disk-shaped member secured to and centered by said brake-head, said member having a bracket-arm forming a side-spring support, an outwardly projecting cylindrical flange concentric with the axle, bearings within said cylindrical flange, and a replacement wheel having a hub for engaging said bearings and secured to said axle-shaft.

12. The combination with an axle housing having a brake-head at the end thereof and an axle-shaft projecting therefrom adapted to carry the load into the wheel, of an attachment comprising a disk-shaped member secured to and centered by said brake-head, a side-spring supporting bracket integral with said member, a cylindrical flange also integral with said member and projecting outward therefrom concentric with and spaced from said axle-shaft, anti-friction bearings engaging said cylindrical flange, and a replacement wheel having a hub for engaging said bearings and secured to said axle-shaft, said hub having a spoke-securing portion surrounding said flange and a brake-drum for coöperating with said brake-head.

In testimony whereof I affix my signature in presence of two witnesses.

NELS L. OLSON.

Witnesses:
ANNA M. DORR,
CHAS. W. STAUFFIGER.